United States Patent Office 3,245,814
Patented Apr. 12, 1966

3,245,814
CEMENTING OF HIGH TEMPERATURE WELLS
Irving R. Dunlap and Freeman D. Patchen, Dallas, Tex., assignors to Socony Mobil Oil Company, Inc., a corporation of New York
No Drawing. Continuation of application Ser. No. 451,691, Aug. 23, 1954. This application Apr. 9, 1964, Ser. No. 358,653
11 Claims. (Cl. 106—93)

This application is a continuation of our copending application Serial No. 451,691, filed August 23, 1954, now abandoned.

This invention relates to cementing and relates more particularly to the cementing of high temperature wells in the earth.

Commonly, casing is secured in place in wells in the earth, such as water wells and petroleum oil and gas wells, by cementing. The cement is forced by pumping from the surface of the ground through tubing to the bottom of the well and from the tubing upwardly between the casing and the walls of the well. After the cement has been pumped between the casing and the walls of the well, pumping is discontinued and the cement is permitted to set in place. Cementing is also often employed to close off a porous earth formation penetrated by a well bore hole in order to prevent loss of fluid into the formation. Cementing procedures are also employed for various other purposes in a well. Ordinarily, in cementing procedures in a well, a hydraulic cement, such as Portland cement, is employed.

In the application of hydraulic cement slurry to a well, it is essential that the time required by the cement to set be sufficiently long to permit placing of the cement slurry. While the use of a hydraulic cement such as Portland cement ordinarily presents no particular difficulty from the standpoint of setting time, a problem from the standpoint of short setting time is presented in wells where high temperatures exist. At high temperatures, hydraulic cement sets rapidly and setting can occur before the cement can be pumped from the surface of the ground into place in the well. With greater depths, greater times are required to pump the cement not only because of the greater distance of travel but also because of the generally decreased diameter of the tubing and, where casing is being cemented, the generally decreased annular clearance between the casing and the walls of the well. Thus, since well temperatures increase with depth, the difficulty of premature setting becomes aggravated in proportion to the depth of the well. A measure of improvement is obtained by employing additives in the cement which retard the setting time and thus increase the pumping time but the additives heretofore employed and the manner of their use have left much to be desired.

It is an object of this invention to provide a method for cementing wells. It is another object of this invention to increase the setting time of hydraulic cement placed in wells. It is another object of this invention to increase pumping time of cement in wells. Further objects of the invention will become apparent from the following detailed description.

In accordance with the invention, an aqueous slurry of a hydraulic cement containing a quantity of carboxymethylhydroxyethyl cellulose is introduced into a well bore hole in the earth adjacent to a formation having a temperature of at least 180° F.

We have discovered that an aqueous slurry of hydraulic cement containing carboxymethylhydroxyethyl cellulose has an appreciably lengthened setting time. Thus, an aqueous slurry of hydraulic cement containing carboxymethylhydroxyethyl cellulose may be pumped, as from the surface of the earth to a position within a well bore hole, for an appreciably longer time than in the absence of the carboxymethylhydroxyethyl cellulose before setting of the cement will occur. By the invention, therefore, pumping of hydraulic cement slurry may be carried out to greater depths and under more severe conditions of temperature and pressure without danger of setting prior to the cement arriving at its desired location.

While we have discovered that the setting time of hydraulic cement is lengthened by the presence of carboxymethylhydroxyethyl cellulose in an aqueous slurry thereof, we have also discovered that the presence of the carboxymethylhydroxyethyl cellulose increases the temperature required for proper attainment of compressive strength within a reasonable time after setting of the cement has begun. Thus, the presence of carboxymethylhydroxyethyl cellulose in a hydraulic cement is not in itself sufficient for achieving satisfactory cementation where increase in setting time is desired. It is, therefore, essential that the slurry of hydraulic cement containing the carboxymethylhydroxyethyl cellulose be subjected to an elevated temperature after placing in position in order that proper setting from the standpoint of attainment of compressive strength will take place. We have determined that this temperature must be at least as high as 180° F.

In the practice of the invention, any type of hydraulic cement may be employed. By hydraulic cement is meant a cement which will set under the action of water. Preferably, Portland cement is used. However, any mixture containing lime, silica and alumina, and commonly used as a hydraulic cement, is satisfactory. Where Portland cement is used, it may be any type heretofore regarded in the cementing art as Portland cement. Portland cement is considered to consist probably of $3CaO \cdot SiO_2$, $3CaO \cdot Al_2O_3$, and $2CaO \cdot SiO_2$, the precise composition varying from one Portland cement to another. Portland cement is made by mixing and grinding a calcarous material with an argillaceous material and heating the mixture in an oven to a temperature in the range of 1350° to 1800° C. until it begins to vitrify. The clinker thus produced is pulverized and mixed with a small amount of gypsum. The Portland cement may be ground to any desired particle size.

While we do not wish our invention to be limited to the consequences of any theoretical considerations, we believe that the effect of the carboxymethylhydroxyethyl cellulose on the setting time of the hydraulic cement is due to physical and chemical adsorption of the large cellulose molecules on or around the cement grains with consequent prevention or retardation of initial hydration.

The amount of carboxymethylhydroxyethyl cellulose must be at least as great as 0.05 percent by weight on the basis of the dry hydraulic cement. By dry hydraulic cement we mean the dry cement prior to admixture with water to form an aqueous slurry of the cement. The extent to which the carboxymethylhydroxyethyl cellulose increases the setting time for a given temperature increases with increasing amounts of carboxymethylhydroxyethyl cellulose. Further, the extent to which a given amount of carboxymethylhydroxyethyl cellulose increases the setting time depends upon the temperature, increases in temperature effecting decreases in the setting time. Accordingly, the amount of carboxymethylhydroxyethyl cellulose employed will depend upon the extent to which the setting time is to be lengthened and upon the temperature of setting.

For the cementing of wells where the temperature of the formation is of the order of 250° F., it is essential that the amount of the carboxymethylhydroxyethyl cellulose be at least as great as 0.10 percent by weight of the dry hydraulic cement. Preferably, for this order of temperature, the amount of carboxymethylhydroxyethyl cellulose is between about 0.2 and about 0.4 percent by weight of the dry hydraulic cement. For the cementing of wells where the temperature of the formation is of the order of 300° F., it is essential that the amount of carboxymethylhydroxyethyl cellulose be at least as great as 0.30 percent by weight of the dry hydraulic cement. Preferably, for temperatures of this order, the amount of carboxymethylhydroxyethyl cellulose should be between about 0.5 and 0.8 percent by weight of the dry hydraulic cement.

On the other hand, the compressive strength of the set cement, for example, the twenty-four hour compressive strength, is affected by the concentration of carboxymethylhydroxyethyl cellulose where the temperature of the cement during setting is in the lower ranges. With greater amounts of carboxymethylhydroxyethyl cellulose, greater decreases in the compressive strength of the set cement for the same setting time are encountered. As the temperature of the cement during setting is increased, the effect of the carboxymethylhydroxyethyl cellulose on the compressive strength of the set cement decreases and at temperatures above about 250° F. the effect of the carboxymethylhydroxyethyl cellulose on the compressive strength of the set cement decreases to the extent that for most purposes it may be disregarded. Where the temperature of the cement during setting is 180° F., the amount of carboxymethylhydroxyethyl cellulose must not be in excess of about .20 percent by weight of the dry cement.

The following examples will be illustrative of the invention.

Example 1

This example will illustrate the effect of increasing quantities of carboxymethylhydroxyethyl cellulose and increasing temperature of setting on the setting time of Portland cement.

Samples of aqueous slurries of Type I Portland cement containing various amounts of carboxymethylhydroxyethyl cellulose were prepared. Each of these samples was then tested in a high pressure, high temperature consistometer for setting time as expressed by the time the cement slurry would remain pumpable. In the consistometer, conditions simulating the pumping of a cement into a well bore hole in the earth are reproduced and the conditions of temperature and pressure are varied to simulate pumping of cement to various depths. In accordance with API Cementing Practice Code RP10B, a cement is regarded as being pumpable until its viscosity, under the pressures and temperatures employed for the particular pumping schedule, i.e., the particular depths of pumping to be simulated, which schedules are set out in the code, exceeds 100 poises. This time is known as the pumping time. The table sets forth the amount of carboxymethylhydroxyethyl cellulose, expressed as weight percent of the dry cement, in each sample, the pumping time before each sample attained a viscosity of 100 poises for the 14,000, the 16,000, and the 18,000 foot schedules, and the minimum pumping time for these three schedules as set forth in the code.

TABLE 1

| Amount of Carboxymethyl-hydroxyethyl Cellulose | Pumping Time, Minutes | | |
|---|---|---|---|
| | 14,000 Ft. | 16,000 Ft. | 18,000 Ft. |
| Minimum | 84 | 91 | 100 |
| 0.050 | 90 | | |
| 0.075 | 120 | | |
| 0.100 | 150 | | |
| 0.20 | | 120 | |
| 0.25 | | 140 | |
| 0.30 | | 160 | |
| 0.40 | | 190 | |
| 0.40 | | | 105 |
| 0.60 | | | 135 |
| 1.00 | | | 180 |
| 1.50 | | | 215 |

Example 2

This example will be illustrative of the compressive strengths attained after setting, or curing, at various temperatures by Portland cement slurries containing various amounts of carboxymethylhydroxyethyl cellulose.

Samples of aqueous slurries of Type I Portland cement containing various amounts of carboxymethylhydroxyethyl cellulose were prepared. Other samples of aqueous slurries of Type I Portland cement free of carboxymethylhydroxyethyl cellulose were also prepared. These samples were then cured under a pressure of 5000 pounds per square inch at various temperatures for a continuous period of twenty-four hours. Following the curing, the compressive strength of each of the samples was measured. The table gives the amount of carboxymethylhydroxyethyl cellulose, expressed as weight percent of the dry cement in each sample, the temperature of setting, and the compressive strength of each sample in pounds per square inch. Where blank spaces appear in the table, samples containing the particular amount of carboxymethylhydroxyethyl cellulose were not cured at the temperature or temperatures indicated. The table also gives the compressive strength of the samples not containing carboxymethylhydroxyethyl cellulose.

TABLE 2

| Amount of Carboxymethyl-hydroxyethyl Cellulose | Compressive Strength—Curing Temperature | | | | |
|---|---|---|---|---|---|
| | 180° F. | 260° F. | 290° F. | 320° F. | 350° F. |
| 0 | 5,200 | 4,500 | 5,500 | 5,000 | 3,300 |
| 0.10 | 2,500 | | | | |
| 0.20 | 800 | 4,140 | | | |
| 0.40 | | 3,700 | 3,400 | 2,430 | 1,680 |
| 0.80 | | 3,830 | | | |
| 1.00 | | | 3,680 | 1,877 | 1,483 |
| 1.50 | | | | | 1,288 |

Having thus described our invention, it will be understood that such description has been given by way of illustration and example and not by way of limitation, reference for the latter purpose being had to the appended claims.

We claim:

1. A cement for cementing in a well-bore hole at a position adjacent to an earth formation penetrated by said well-bore hole and having a temperature at least as great as 180° F. comprising hydraulic cement admixed with, as the sole agent for increasing the setting time of said cement, carboxymethylhydroxyethyl cellulose in an amount in the range of 0.05 to 0.2 percent by weight of said hydraulic cement and to provide a set cement having a twenty-four hour compressive strength when set at said temperature of at least 800 pounds per square inch.

2. A cement for cementing in a well-bore hole at a position adjacent to an earth formation penetrated by said well-bore hole and having a temperature at least as great as 180° F. comprising hydraulic cement admixed with, as the sole agent for increasing the setting time of said cement, carboxymethylhydroxyethyl cellulose in an amount in the range of 0.2 to 0.4 percent by weight of said hydraulic cement and to provide a set cement having a twenty-four hour compressive strength when set at said temperature of at least 800 pounds per square inch.

3. The process of cementing a well bore hole in the earth comprising pumping through said well bore hole to a position adjacent to an earth formation penetrated by said well bore hole and having a temperature at least as great as 180° F. an aqueous slurry of a hydraulic cement containing as the sole agent for increasing the setting time of said cement, carboxymethylhydroxyethyl cellulose in an amount sufficient to effect increase in the setting time of said hydraulic cement and to provide a set cement having a twenty-four hour compressive strength when set at said temperature of at least 800 pounds per square inch and permitting said aqueous slurry of hydraulic cement to set in said position adjacent to said formation at a temperature at least as great as 180° F.

4. The process of claim 3 wherein the amount of said carboxymethylhydroxyethyl cellulose is at least as great as 0.05 percent by weight of the dry hydraulic cement.

5. The process of claim 3 wherein said carboxymethylhydroxyethyl cellulose is in an amount between at least as great as 0.05 percent and 0.8 percent by weight of the hydraulic cement.

6. The process of claim 3 wherein the amount of said carboxymethylhydroxyethyl cellulose is at least as great as 0.5 percent but not in excess of 0.20 percent by weight of the dry hydraulic cement.

7. The process of claim 3 wherein the temperature of said formation is about 250° F. and wherein the amount of said carboxymethylhydroxyethyl cellulose is at least as great as 0.10 percent by weight of the dry hydraulic cement.

8. The process of claim 7 wherein the amount of said carboxymethylhydroxyethyl cellulose is between about 0.2 and 0.4 percent by weight of the dry hydraulic cement.

9. The process of claim 3 wherein the temperature of said formation is about 300° F. and wherein the amount of said carboxymethylhydroxyethyl cellulose is at least as great as 0.30 percent by weight of the dry hydraulic cement.

10. The process of claim 9 wherein the amount of said carboxymethylhydroxyethyl cellulose is between about 0.5 and 0.8 percent by weight of the dry hydraulic cement.

11. The process of cementing a well bore hole in the earth comprising pumping through said well bore hole to a position adjacent to an earth formation penetrated by said well bore hole and having a temperature at least as great as 180° F. an aqueous slurry of Portland cement containing as the sole agent for increasing the setting time of said cement carboxymethylhydroxyethyl cellulose in an amount sufficient to effect increase in the setting time of said Portland cement and to provide a set cement having a twenty-four hour compressive strength when set at said temperature of at least 800 pounds per square inch, and permitting said aqueous slurry of Portland cement to set in said position adjacent to said formation at a temperature of at least as great as 180° F.

References Cited by the Examiner
UNITED STATES PATENTS
2,995,189   8/1961   Cutforth _____ 106—93

TOBIAS E. LEVOW, *Primary Examiner.*

S. E. MOTT, *Assistant Examiner.*

UNITED STATES PATENT OFFICE
CERTIFICATE OF CORRECTION

Patent No. 3,245,814                                          April 12, 1966

Irving R. Dunlap et al.

It is hereby certified that error appears in the above numbered patent requiring correction and that the said Letters Patent should read as corrected below.

Column 5, line 14, for "0.5" read -- 0.05 --.

Signed and sealed this 13th day of June 1967.

(SEAL)
Attest:

ERNEST W. SWIDER                                  EDWARD J. BRENNER
Attesting Officer                                      Commissioner of Patents